United States Patent
Vargas

(10) Patent No.: US 9,969,533 B1
(45) Date of Patent: May 15, 2018

(54) REUSABLE ZIPPER

(71) Applicant: Rodrigo Rafael Vargas Vargas, Delegación Cuahutémoc (MX)

(72) Inventor: Rodrigo Rafael Vargas Vargas, Delegación Cuahutémoc (MX)

(*) Notice: Subject to any disclaimer, the term of this patent is extended or adjusted under 35 U.S.C. 154(b) by 0 days. days.

(21) Appl. No.: 15/445,101

(22) Filed: Feb. 28, 2017

(51) Int. Cl.
*B65D 33/25* (2006.01)
*B65D 33/16* (2006.01)
*B65D 77/40* (2006.01)
*A44B 19/26* (2006.01)

(52) U.S. Cl.
CPC ..... *B65D 33/2591* (2013.01); *B65D 33/1691* (2013.01); *B65D 77/40* (2013.01); *A44B 19/26* (2013.01); *Y10T 24/2561* (2015.01)

(58) Field of Classification Search
CPC .......... B65D 33/2591; B65D 33/1691; B65D 77/40; A44B 19/26; Y10T 24/2561
See application file for complete search history.

(56) References Cited

U.S. PATENT DOCUMENTS

| 2,994,469 | A  | * | 8/1961  | Troup ................ | A44B 19/267 229/87.05 |
| 5,067,207 | A  | * | 11/1991 | Semons .............. | A41H 37/003 135/115 |
| 5,167,608 | A  |   | 12/1992 | Steffens, Jr. | |
| 6,287,000 | B1 | * | 9/2001  | Buchman ........... | B65D 33/2591 24/399 |
| 2003/0019085 | A1 | * | 1/2003 | Loglisci ............. | A41H 37/003 24/304 |
| 2011/0068025 | A1 | * | 3/2011 | Whittemore ......... | E06B 3/80 206/225 |

* cited by examiner

*Primary Examiner* — Robert Sandy
*Assistant Examiner* — Michael S Lee
(74) *Attorney, Agent, or Firm* — James R. McDaniel

(57) ABSTRACT

An adhesive reusable zipper that may be applied "in situ" to a preexisting bag; this reusable zipper has a single-piece integral cutting device that includes the slider block. The integral cutter includes a tip to pierce the beg and a blade to cut the beg lengthwise along the fastening strip in a non-harmful way, in order to make an opening in the beg so that it may be closed again, making it easy for the user to serve certain food products and close the bag easily and effectively. Furthermore, once the beg is no longer useful, the closure medium may be reused on another bag.

6 Claims, 3 Drawing Sheets

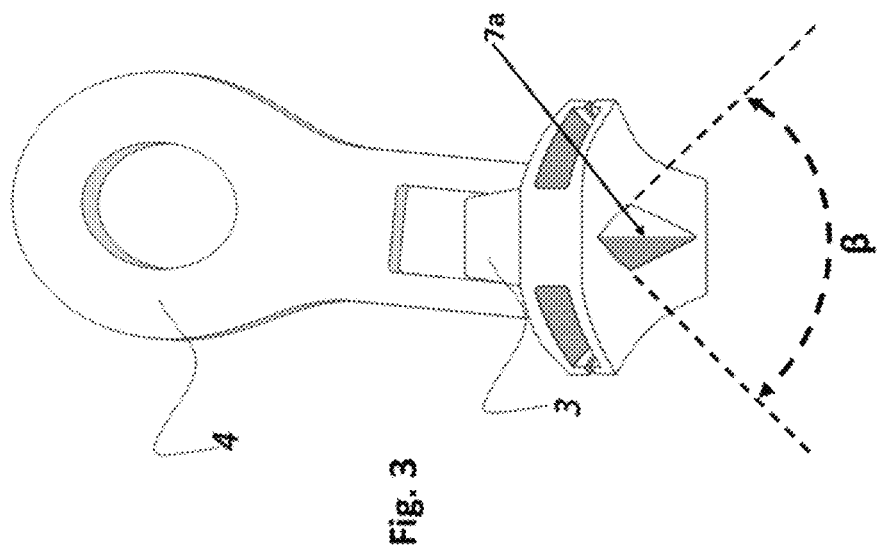
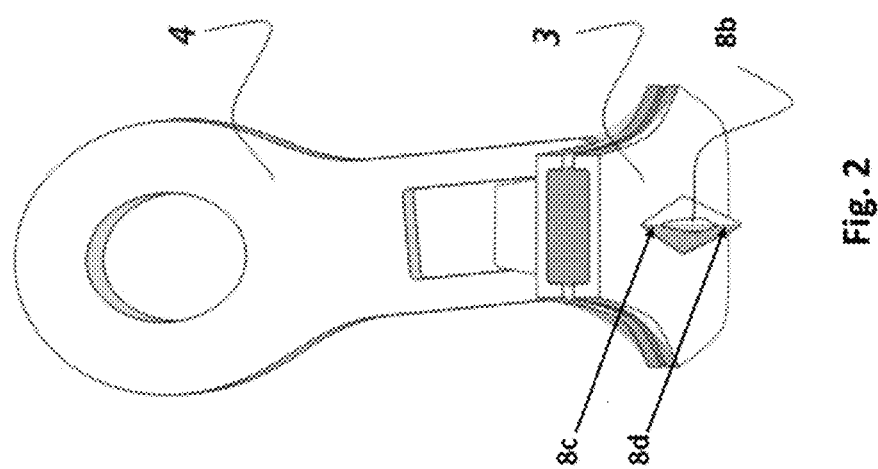

REUSABLE ZIPPER

TECHNICAL FIELD OF THE INVENTION

The current invention refers to, in general, a closure medium such as an adhesive reusable zipper that may be applied "in situ" to a pre-existing bag; said reusable zipper also has a means of cutting to make an opening in the bag in order to facilitate the unpacking of certain food products and the easy and effective re-closing of the bag. In addition, once the bag is no longer useful, the closing medium may be reused on another bag.

BACKGROUND OF THE INVENTION

At present, there are zippers with cutting mechanisms that are applied to a bag in order to provide an additional opening, as those described in U.S. Pat. No. 5,167,608, published in December 1992, which discloses a flexible component which adheres to a bag by means of an adhesive strip located at a lower surface, with zipper strips and a closure head, which includes a reciprocating plunger rod mounted to the strip. There are many types of zippers with cutting mechanisms coupled to or separated from the closure head of the zipper, such as the device published in U.S. Pat. No. 5,167,608. The coupling between elements may cause injuries to the user when opening the zipper; moreover, the manufacturing and assembly process is long and expensive.

The purpose of this invention is to solve the aforementioned difficulties by introducing a reusable zipper with a single-piece closure head, with a sharp element and a cutting zone with technical features that prevent the user from being injured when using it.

DESCRIPTION OF THE INVENTION

Brief Description of the Figures

FIG. 2 is a back perspective view of the reusable zipper slider block.

FIG. 3 is a frontal perspective view of the reusable zipper slider block.

DETAILED DESCRIPTION OF THE INVENTION

Figure 1:
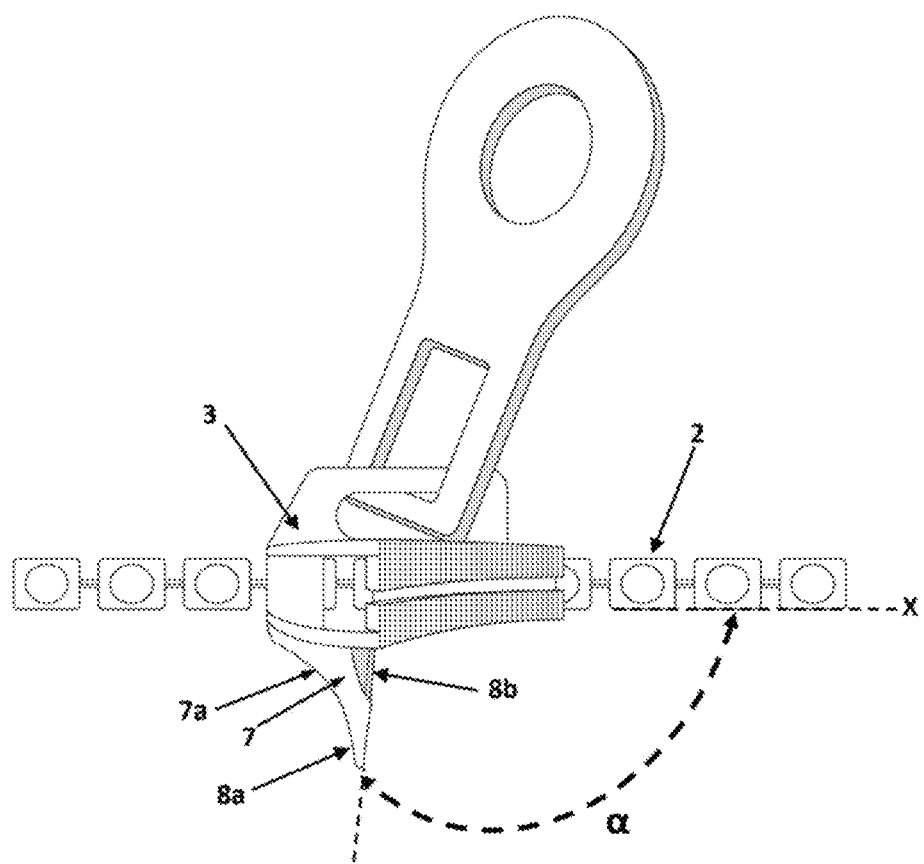
FIG. 1 is a side perspective view of the reusable zipper assembly of the invention.
Figure 4:
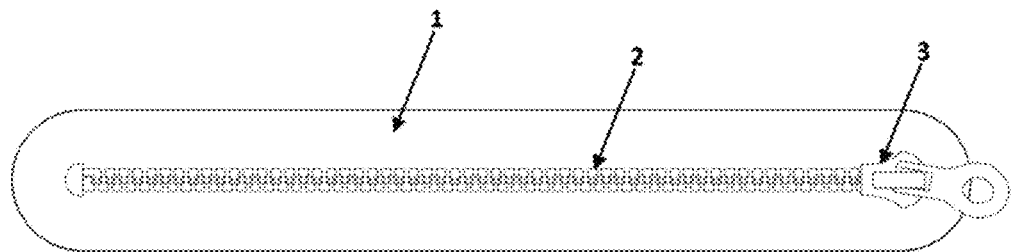
FIG. 4 is an upper perspective view of the reusable zipper assembly of the invention.
Figure 5:
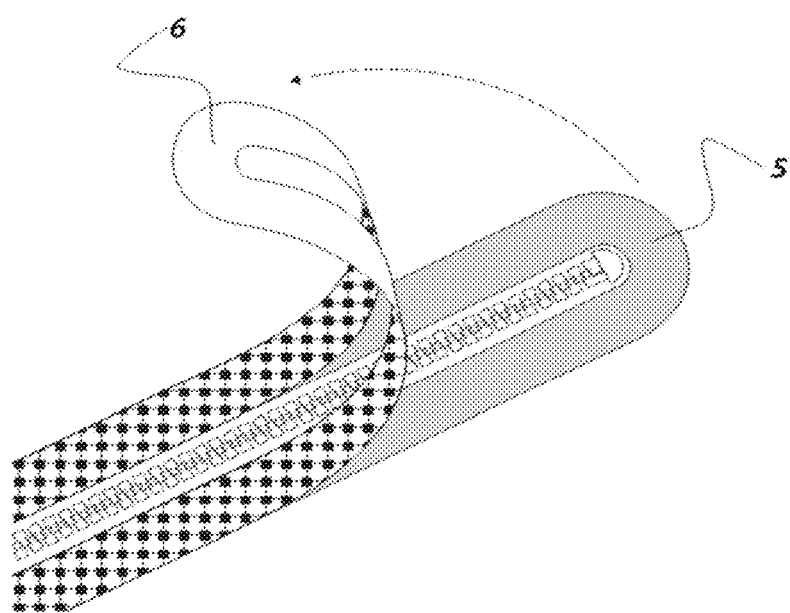
FIG. 5 is an image of a disassembled protective paper of the reusable zipper of the current invention.

As shown in the figures, the invention is a closure medium that, in the preferred embodiment, is treated as a reusable zipper for plastic bags; this type of zipper is usually used with food that has lost its freshness once its package has been opened, due to the package remaining open until the product has been consumed or it has expired. An example of this is breakfast cereal, but this occurs to many other food products packaged in sealed bags, such as coffee or pasta. The creation of this zipper for the instantaneous opening of bags to preserve cereals and other food products is intended to solve this problem, allowing the repeated opening and closing of these products until the content has been consumed in order to avoid food waste. The use of this zipper will reduce the use of thousands of bags and other secondary packages employed at home to transfer products from the original package to a secondary package in order to keep them well sealed and not leave the original bag semi-opened until the product is consumed.

In another embodiment, the features of the zipper slider block of this invention may be combined with other types of zippers designed to provide airtightness, such as female-male strips.

The zipper comprises a fastening strip (1) which consists of a primary round end and a secondary round end with an adhesive rear surface (5) covered by a protective paper (6). The dimensions of the fastening strip may vary according to the size of the bag. Where the adhesive rear surface (5) functions to fasten the zipper to the plastic bag, the adhesive of the rear adhesive surface (5) is such that it allows the easy adherence to and removal from the bag so the zipper may be reused.

The zipper comprises longitudinal closure means which in the preferred embodiment of the invention are two tracks of teeth (2) arranged lengthwise and at the center of the fastening strip (1), as well as a slider block (3) that slides over the tracks of teeth (2) to dose or open the zipper by a pull tab (4).

In order to allow the user to open the bag without being injured, the zipper comprises an integral cutting device (7) that is manufactured in a single piece with the slider block (3). The integral cutting device (7) consists of a tip (8a) used to pierce the bag and a blade (8b) used to cut the bag lengthwise along the fastening strip (1). Thanks to these features, it is possible to pierce the bags of the packaged products that are to be opened and preserved. After piercing the bag with the tip (8a), the blade (8b) opens and cuts the bag automatically at the first opening of the zipper.

Despite containing a sharp tip (8a) and blade (8b), this zipper is designed with the user's safety in mind for home use, which is why the tip (8a) is round so as not to harm the user and has the minimum requirements to pierce a plastic bag. Furthermore, the blade (8b) is concealed and out of reach of fingers and any part of the body.

One of the main features of the invention is that the slider block (3) comprises a lower base that includes (in one piece) the integral cutting device (7) with a front side, a rear side and a lower side. On the lower side is the non-harmful tip (8a), with which the bags are pierced at the point where the zipper is adhered. For the user's safety, the structure of the integral cutting device (7) wraps around the blade (8b), which cuts the bag at the first opening of the zipper.

The blade (8b) is on the rear side of the integral cutting device (7) and is wrapped or protected between an upper (8c) and a lower space (8d).

The performance of the invention depends on the optimal positions and angles of the integral cutting device (7), which must be in a primary cutting angle (a) that ranges from 94° to 98° with 96° being the preferred angle with regard to a horizontal line (x). This inclination is optimal for cutting the bags in the easiest way and without getting stuck in the plastic material used to package most food products.

Another main feature of the integral cutting device (7) is that it comprises a splitter (7a) located at the front consisting of two surfaces that create a splay angle (P) that ranges from 85° to 95° with 90° being the preferred angle, and which forms an aerodynamic curve of the front side of the integral cutting device (7). This splitter (7a) separates the recently cut material from the bag when the package needs to be dosed again. Additionally, it prevents the bag from getting stuck when opening and closing the zipper as many times as needed; in this way, the reusable zipper of the invention may be used to open and close a bag several times.

Following the above, the method for opening and closing the bag several times comprises the following steps:
  a) Providing a zipper like the one described and illustrated;
  b) Adhering the zipper to a bag;
  c) Pressing the slider block (3) so the tip (8a) of the integral cutting device (7) pierces the bag;
  d) Sliding the slider block (3) with the tab (4) to open and cut the bag without risk to the user by using the blade (8b);
  e) Opening and closing the bag several times using the slider block (3) and the zippers (2).

I claim:

1. A reusable zipper for plastic bags comprising:
   a fastening strip consisting of an adhesive rear surface covered by protective paper, wherein the adhesive surface functions to fasten the zipper to a plastic bag;
   longitudinal closure means placed lengthwise at the center of the fastening strip;
   a slider block which slides over the longitudinal closure means to close or open the zipper; and
   an integral cutting device in a single piece with the slider block, wherein the integral cutting device comprises a tip to pierce the bag and a blade to make a longitudinal cut along the fastening strip, wherein the integral cutting device has an inclination defined by a first cutting angle ($\alpha$) ranging from 94° to 98° with regard to a horizontal line (x).

2. A reusable zipper for plastic bags, according to claim 1, in which the longitudinal closure means are two guiding tracks of teeth.

3. A reusable zipper for plastic bags, in accordance with claim 1, wherein the integral cutting device comprises a front side, a rear side and a lower side, wherein the tip is used to pierce the bag where the zipper is adhered on the lower side, wherein the blade is wrapped on the rear side to prevent harm to the user such that the blade cuts the bag at a first opening of the zipper.

4. A reusable zipper for plastic bags, according to claim 1, wherein the adhesive on the rear adhesive surface is such that it allows the easy adherence to and removal from the bag such that the zipper can be reused.

5. A reusable closure for plastic bags, according to claim 1, wherein the integral cutting device comprises a splitter positioned on a front side of the integral cutting device, such that the splitter is formed by two surfaces that A create a splay angle ($\beta$) ranging from 85° to 95°, which forms an aerodynamic curve of the front side of the integral cutting device such that the splitter separates the recently cut material from the bag when the package is to be closed again.

6. An opening method comprising the following steps:
   a) providing a zipper, wherein the zipper includes a fastening strip consisting of an adhesive rear surface covered by protective paper, wherein the adhesive surface functions to fasten the zipper to a plastic bag, a longitudinal closure means placed lengthwise at the center of the fastening strip, a slider block which slides over the longitudinal closure means to close or open the zipper, and an integral cutting device in a single piece with the slider block, wherein the integral cutting device includes a tip to pierce the bag and a blade to make a longitudinal cut along the fastening strip, wherein the integral cutting device has an inclination defined by a first cutting angle ($\alpha$) ranging from 94° to 98° with regard to a horizontal line (x);
   b) adhering the zipper to a bag;
   c) pressing the slider block so the tip of the integral cutting device pierces the bag;
   d) sliding the slider block with a tab to open and cut the bag in non-harmful way using the blade; and
   e) closing and opening the bag as many times as necessary by using the slider block and the zipper.

* * * * *